UNITED STATES PATENT OFFICE.

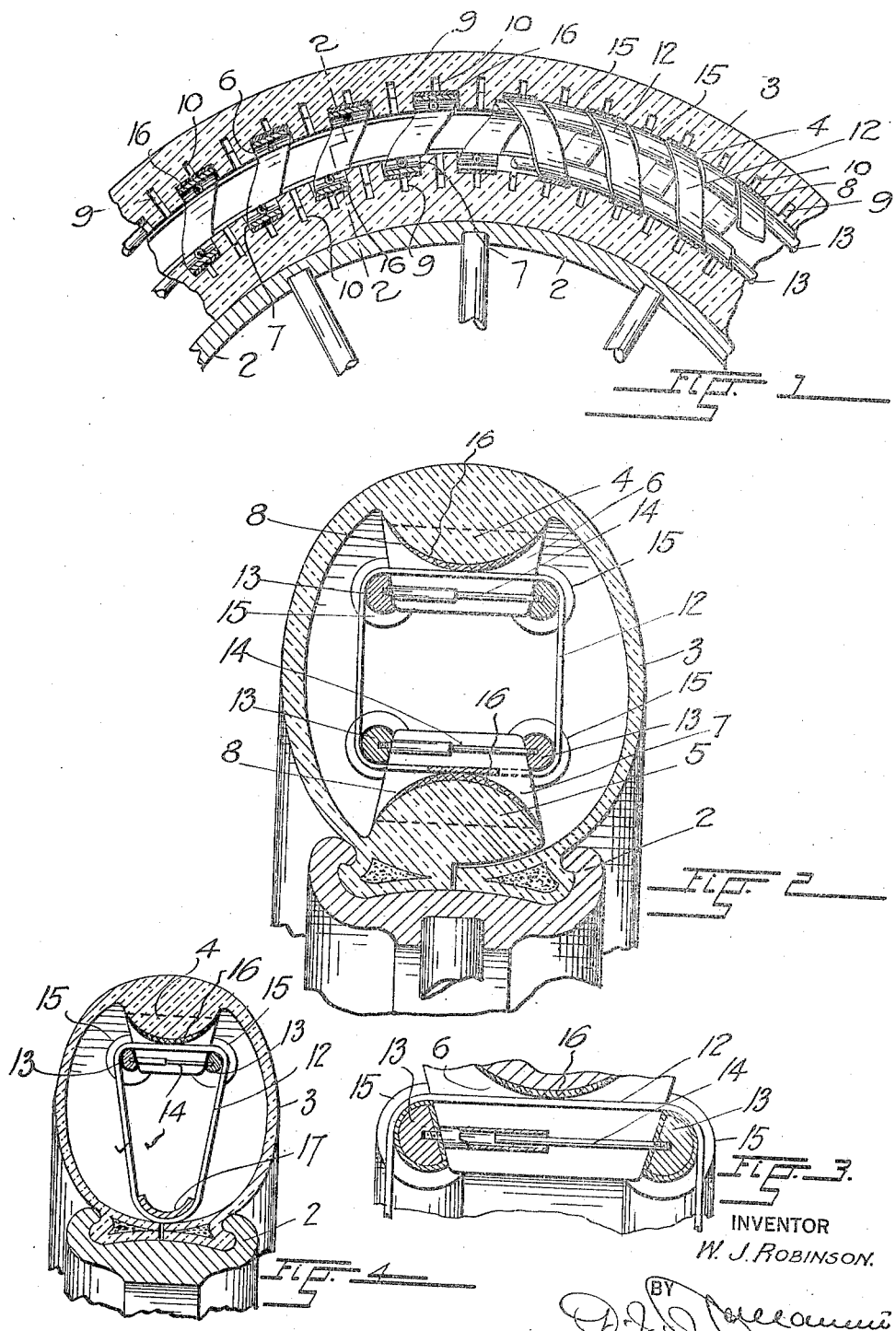

WILLIAM J. ROBINSON, OF DENVER, COLORADO.

TIRE.

1,291,156.

Specification of Letters Patent. Patented Jan. 14, 1919.

Application filed December 19, 1917. Serial No. 207,885.

*To all whom it may concern:*

Be it known that I, WILLIAM J. ROBINSON, a citizen of the United States, residing at Denver, in the county of Denver and State of Colorado, have invented certain new and useful Improvements in Tires, of which the following is a specification.

This invention relates to tires of the type used principally on the wheels of motor-vehicles and more especially to tires of the character shown and described in Patent No. 1,250,510, granted to me December 18, 1917.

It is the object of the present invention to provide certain new and useful improvements in the construction and arrangements of the coöperative parts of a tire of the character mentioned, which increases the resiliency of the tire, reduces the cost of its production, and lengthens the period of its efficiency.

With this object in view my improved tire consists of the construction, arrangements of parts and combinations of devices shown in the accompanying drawings, in the various views of which like parts are similarly designated and in which—

Figure 1 is a longitudinal section through my improved tire,

Fig. 2, an enlarged transverse section of the tire taken along the line 2—2, Fig. 1, Fig. 3, an enlarged cross-sectional view of the outer portion of the interior parts of the tire, and Fig. 4, a transverse section of the tire drawn to a reduced scale, and showing a modification of its construction.

Referring more specifically to the drawings, the reference numeral 2 designates the felly or rim base of a vehicle-wheel, which has in its outer face a recessed seat for the reception of the ridged inner part of a rubber tire of the so-called clencher type.

The tire is composed of an outer covering or shoe 3 which in form and exterior construction is similar to those of the pneumatic tires at present in common use.

The longitudinal edges of the covering overlap at its basal portion which engages the seat of the felly and the covering has interiorly in the median plane of its tread two opposite annular ridges 4 and 5 which are formed integrally therewith and of the same material of which it is composed.

The ridges are transversely grooved to provide recesses 6 and 7 for the reception of parts of an elastic element mounted within the shoe as will hereinafter be more fully described and the bottom surfaces of these recesses are rounded, as at 8, to permit of a flexing movement of said elastic parts when the tire is in use.

To increase the resiliency of the shoe, the ridges 4 and 5 are transversely incised at points between their recesses and in the bottom surfaces of the same as shown at 9 and 10 in Fig. 1 of the drawings.

The resilient element of the tire which in the present invention takes the place and performs the functions of the body of compressed air in pneumatic tires, consists in the preferred form of my invention of a continuous elastic band 12 which in the form of my invention shown in Figs. 1 and 2, is wound around an annular structure composed of four hoops 13 placed in pairs at opposite sides of the ridges 4 and 5.

The hoops are made of steel or other durable material incased in envelops of softer material to prevent injury of the parts with which they come in contact when the tire is in use.

The opposite hoops of the two pairs are movably connected by transverse braces 14 which as best shown in Fig. 3 of the drawings are each composed of two telescoping parts. Although these braces impart a desirable degree of rigidity to the spring-supporting structure and facilitate assembling of its parts, they are not essential in the operation of the tire and may be omitted if so desired for reasons of economy and simplicity of construction.

When the resilient element is in place within the tire-shoe, its four hoops are in sliding contact with the opposite sides of the ridges thereof and the portions of the elastic band extending transversely between the hoops, pass through the recesses of the ridges in engagement with the curved bottom surfaces thereof.

The portions of the hoops at which they engage the ridges, are preferably flattened as shown in the drawings to provide faces which lie evenly against the respective sides of the same.

To keep the elastic band from contact with the wall of the shoe and thereby prolong its life and also to prevent relative displacement or creeping of the convolutions of the same, the spaces on the hoops between the turns of the band are filled with strips 15 of felt or other soft material which is thicker than the band and projects beyond the outer surface thereof. Pads 16 of soft material are placed within the recesses of the ridges over the incisions 10 to prevent wear.

The resilient element of the tire as hereinbefore described may be varied in the construction and arrangement of its component parts within the spirit of my invention and the construction of the tire-shoe can be modified accordingly.

Only one of these variations has been shown in the drawings as an illustration of the many changes of which my improved tire-construction is capable.

In Fig. 4 of the drawings, a single hoop 17 takes the place of the two inner hoops of the structure shown in Figs. 1 and 2.

The inner ridge of the tire-shoe is omitted and the single hoop is placed in direct contact with the inner surface of the shoe, and the hoop 17 instead of being made of wire, as in the first-described form of the invention, is concavo-convex in cross-section to provide an increased bearing-surface for the elastic band.

It will be understood without further illustration, that instead of using a continuous band, the elastic element of my invention may be composed of a number of separate elastic bands which encircle the hoops of the supporting structure in spaced relation to each other.

Having thus described my invention what I claim and desire to secure by Letters-Patent is:

1. A tire comprising a flexible shoe having inward of its tread, an inwardly projecting ridge which is recessed at intervals and incised within its recesses to increase its flexibility, pads covering said incisions, an annular structure within the shoe, including hoops at opposite sides of said ridge, and an elastic element including a number of parts extending between said hoops in engagement with said pads.

2. A tire comprising a flexible shoe having inward of its tread, an inwardly projecting ridge, which is recessed at intervals, an annular structure within the shoe, including hoops at opposite sides of said ridge, longitudinally extensible braces connecting said hoops, and an elastic element including a number of parts extending between said hoops in engagement with the ridge within its recesses.

3. A tire comprising a flexible shoe having in alinement with its tread, opposite inwardly projecting ridges which are recessed at intervals, an annular structure within the shoe, composed of hoops disposed at opposite sides of said ridges, longitudinally extensible braces connecting opposite hoops of the structure, and an elastic element encircling the hoops with its transverse parts in engagement with the ridges within the recesses thereof.

4. A tire comprising a flexible shoe having inward of its tread, an inwardly projecting ridge, an annular structure within the shoe, including hoops at opposite sides of said ridge, an elastic element including a number of parts extending between said hoops, in engagement with the ridge, and fillings occupying the spaces on the hoops between said parts of the elastic element.

5. A tire comprising a flexible shoe having inward of its tread, an inwardly projecting ridge, an annular structure within the shoe, including hoops at opposite sides of said ridge, an elastic element including a number of parts extending between said hoops, in engagement with the ridge, and fillings of a thickness exceeding that of said parts of the elastic element, occupying the spaces on the hoops between the same.

6. A tire comprising a flexible shoe having inward of its tread, an inwardly projecting ridge, an annular structure within the shoe, including hoops loosely engaging the sides of the ridge in spaced relation to the flexible walls of the shoe, and an elastic element including a plurality of parts supported upon said hoops in engagement with said ridge.

7. A tire comprising a flexible shoe having inward of its tread, opposite annular ridges, an annular structure composed of hoops arranged in separate pairs at opposite sides of the ridges, and an elastic element including a number of parts encircling the hoops in engagement with the ridges.

8. A tire comprising a flexible shoe having inward of its tread, opposite annular ridges which are recessed at intervals, an annular structure composed of hoops arranged in separate pairs at opposite sides of the ridges, and an elastic element including a number of parts encircling the hoops and extending in the recesses of the ridges in engagement with the bases thereof.

9. A tire comprising a flexible shoe having inward of its tread, an annular ridge, a structure within the same, including a pair of annular members at opposite sides of the ridge and a third annular member separate from the other members and engaging the shoe at another point, and an elastic element encircling the members of the structure and including a number of parts in engagement with the ridge.

In testimony whereof I have affixed my signature in presence of two witnesses.

WILLIAM J. ROBINSON.

Witnesses:
G. J. ROLLANDET,
L. RHOADES.